G. E. BURTSCHER.
HOSE CLAMP TOOL.
APPLICATION FILED DEC. 2, 1907.

899,657.

Patented Sept. 29, 1908.

Witnesses:
H. S. Austin
A. A. Olson

Inventor:
George E. Burtscher
by Joshua R. H. Potts
Atty.

UNITED STATES PATENT OFFICE.

GEORGE E. BURTSCHER, OF CHICAGO, ILLINOIS.

HOSE-CLAMP TOOL.

No. 899,657.　　　Specification of Letters Patent.　　Patented Sept. 29, 1908.

Application filed December 2, 1907. Serial No. 404,878.

*To all whom it may concern:*

Be it known that I, GEORGE E. BURTSCHER, a citizen of the United States, residing at Chicago, county of Cook, and State of Illinois, have invented certain new and useful Improvements in Hose-Clamp Tools, of which the following is a specification.

My invention relates to hose clamp tools and the object of my invention is to provide a hose clamp tool which shall be simple of construction, of low cost to manufacture and which shall be easy to operate.

The device is adapted for securing a coupling member to a hose by securely fastening or clamping a wire loop about the same. For this purpose a loop of wire is bent about the hose and the free ends of the wire are passed through the loop and bent back after the wire has been drawn tight. It is extremely difficult to draw the loop tight enough to hold the coupling member in the hose and then bend the end of the wires back before they slip.

The purpose of my invention is to provide a simple and efficient tool for this purpose.

My invention consists generally in a screw having a wedge shaped block swiveled to the end thereof, the block having a groove to receive the loop portion of the wire, a block threaded on said screw and having a pair of holes to receive the ends of the wire, the holes being arranged one on each side of the screw and parallel therewith and a suitable device on the end of the screw for turning the same.
My invention further consists in various details of construction and arrangements of parts all as will be hereinafter fully described and particularly pointed out in the claims.

Figure 1:
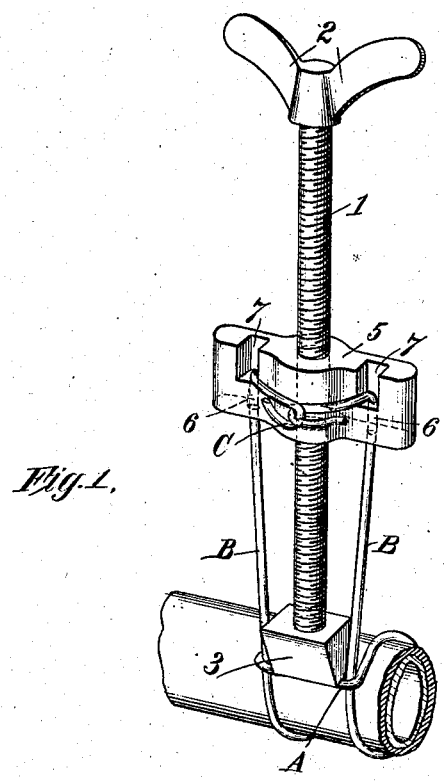
Figure 2:
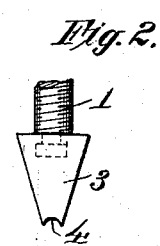
Figure 3:
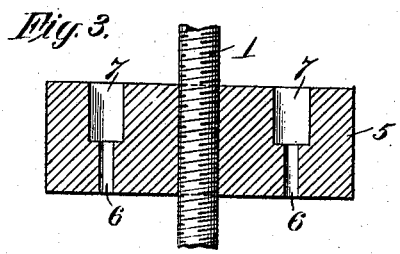

My invention will be more readily understood by reference to the accompanying drawings forming a part of this specification and in which, Figure 1 is a perspective view of a clamping tool embodying my invention in its preferred form, illustrating the device in operation, Fig. 2 is a side elevation of the wedge shaped block, and Fig. 3 is a longitudinal section of the traveling block.

Referring to the drawings, 1 indicates a screw, threaded throughout its length and provided with a butterfly head or handle, 2 by which it may be turned. Swiveled to the opposite end of the screw, 1 is a wedge shaped block, 3 having a longitudinal groove, 4 extending across its lower edge. The groove, 4 is adapted to receive the loop, A, of the wire clamp and by being wedge shaped with the narrow edge at the bottom it is free to turn about the loop to properly bend the wire.

Threaded upon the screw, 1 is a block, 5 having a pair of holes, 6 to receive the ends of the wire. The holes, 6 are arranged one on each side of the screw and parallel therewith. The holes, 6 are of small and uniform diameter for substantially half way through the block, after which they are enlarged into the recesses, 7 which extend through the sides of the clamp. This permits the free ends of the wire to be more freely drawn through the holes and to be then bent laterally through the sides of the recesses and twisted together on the side of the block.

In using the device a piece of wire is looped and its free ends bent about the hose and passed through the loop. The ends, B are then passed through the holes, 6 in the block 5. The block, 3 is then placed on the loop, A, the loop resting in the groove, 4, and the ends of the wires drawn through the sides of the recesses, 7 and twisted together as at C on the side of the block, 5. The screw is then turned drawing the wire tight about the hose. When the wire approaches the breaking strain, the tool is turned back with the loop A as a pivot bending the wires firmly about the loop after which they may be cut off.

Having described my invention what I claim as new and desire to secure by Letters Patent is:

In a device of the class described, a screw having a grooved wedge shaped block swiveled to one end thereof in combination with a block threaded on said screw said block having a pair of wire receiving holes extending therethrough parallel with the screw and one upon each side thereof, said holes terminating in enlarged recesses extending through the side and top of the block, said wedge shaped block being adapted to engage the loop of a wire clamp the free ends of which are passed through said holes and recesses and twisted upon the outside of the block, substantially as described.

In testimony whereof I have signed my name to this specification in the presence of two subscribing witnesses.

GEORGE E. BURTSCHER.

Witnesses:
　H. B. GATES,
　ALF. D. DANFORTH.